United States Patent
Hochstetler et al.

(10) Patent No.: US 10,641,344 B2
(45) Date of Patent: May 5, 2020

(54) DISCONNECT PLUNGER FOR INTEGRATED DRIVE GENERATOR

(71) Applicant: HAMILTON SUNDSTRAND CORPORATION, Charlotte, NC (US)

(72) Inventors: Derek R. Hochstetler, Rockford, IL (US); Ted A. Martin, Byron, IL (US); Duane C. Johnson, Beloit, WI (US); Glenn C. Lemmers, Jr., Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 132 days.

(21) Appl. No.: 15/820,631

(22) Filed: Nov. 22, 2017

(65) Prior Publication Data
US 2019/0154091 A1 May 23, 2019

(51) Int. Cl.
*F16D 23/12* (2006.01)
*H02K 7/116* (2006.01)
(Continued)

(52) U.S. Cl.
CPC ............. *F16D 23/12* (2013.01); *F02C 7/32* (2013.01); *F02C 7/36* (2013.01); *F16D 11/14* (2013.01);
(Continued)

(58) Field of Classification Search
CPC . F16D 23/12; F16D 2023/123; H02K 7/1823; H02K 7/003; H02K 7/116; F02C 7/32; F05D 2220/32; F05D 2220/76
See application file for complete search history.

(56) References Cited

U.S. PATENT DOCUMENTS 3,187,868 A * 6/1965 Gantzer ................ F16D 11/14
192/101
3,220,218 A * 11/1965 Rio .......................... F02C 7/32
464/33
(Continued)

FOREIGN PATENT DOCUMENTS

DE 102015121681 A1 * 6/2016 ............. F16D 23/12
EP 3121473 1/2017
(Continued)

OTHER PUBLICATIONS

The Extended European Search Report for EP Application No. 18207205.8, dated Apr. 12, 2019.

*Primary Examiner* — Mark A Manley
(74) *Attorney, Agent, or Firm* — Carlson, Gaskey & Olds, P.C.

(57) ABSTRACT

A disconnect plunger for use in an integrated drive generator includes a plunger body extending between a first end and a second end. A cam surface is formed on the second end, and has a cylindrical cam portion extending across the second end. The cylindrical cam portion has a location formed at a radius about a point spaced beyond the second end relative to the first end. A first distance is defined from a second end facing surface of a cylindrical guide portion positioned intermediate first and second end. A ratio of the first radius to the first distance is between 0.15 and 0.30. The point is spaced in a direction perpendicular to a center axis of the plunger body, and measured from the center axis by a second distance. A ratio of the second distance to the first radius is between 0.25 and 0.40. An integrated drive generator and a method of replacing a disconnect shaft are also disclosed.

3 Claims, 2 Drawing Sheets

(51) Int. Cl.
  *F02C 7/32* (2006.01)
  *H02K 7/00* (2006.01)
  *H02K 7/18* (2006.01)
  *F16D 11/14* (2006.01)
  *F02C 7/36* (2006.01)

(52) U.S. Cl.
  CPC ............ *H02K 7/003* (2013.01); *H02K 7/116* (2013.01); *H02K 7/1823* (2013.01); *F05D 2220/32* (2013.01); *F05D 2220/76* (2013.01); *F16D 2023/123* (2013.01)

(56) References Cited

U.S. PATENT DOCUMENTS

| | | | | |
|---|---|---|---|---|
| 4,244,455 | A | 1/1981 | Loker | |
| 5,353,902 | A * | 10/1994 | Flowtow | F16D 23/12 |
| | | | | 192/84.6 |
| 8,963,391 | B2 * | 2/2015 | Grosskopf | F01D 5/026 |
| | | | | 310/78 |
| 10,323,736 | B2 * | 6/2019 | Beard | F16D 11/14 |
| 2010/0283341 | A1 * | 11/2010 | Grosskopf | F01D 5/026 |
| | | | | 310/78 |
| 2013/0112522 | A1 | 5/2013 | Granzow et al. | |
| 2017/0016489 | A1 * | 1/2017 | Grosskopf | F16D 23/12 |
| 2018/0106302 | A1 * | 4/2018 | Campbell | F16D 11/10 |
| 2018/0172082 | A1 * | 6/2018 | Lee | F16D 23/12 |

FOREIGN PATENT DOCUMENTS

| | | | | |
|---|---|---|---|---|
| GB | 491628 | * | 9/1938 | ............ B60N 2/067 |
| WO | WO-9728404 A1 | * | 8/1997 | ............ F21S 8/028 |

\* cited by examiner

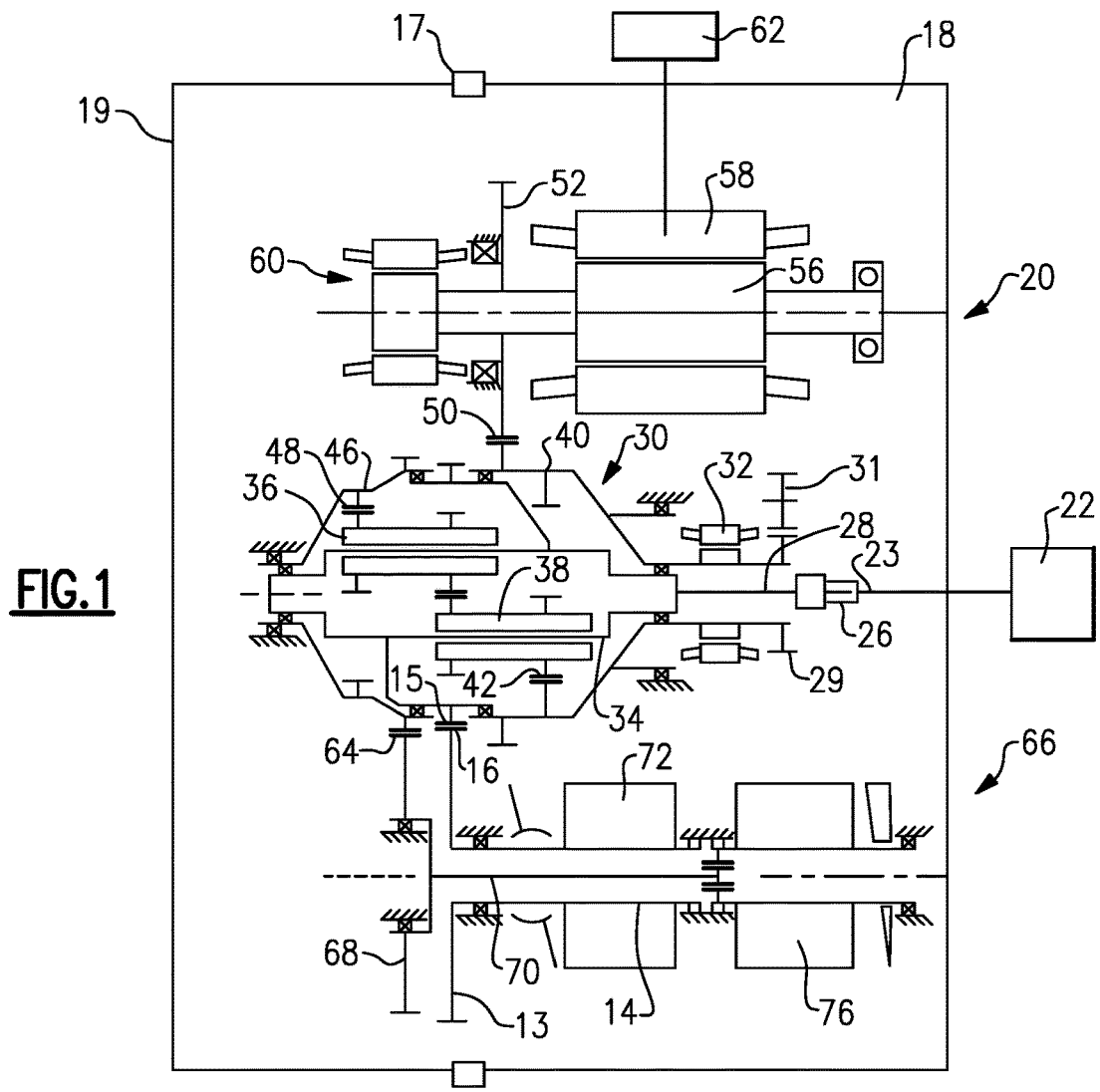
FIG.1
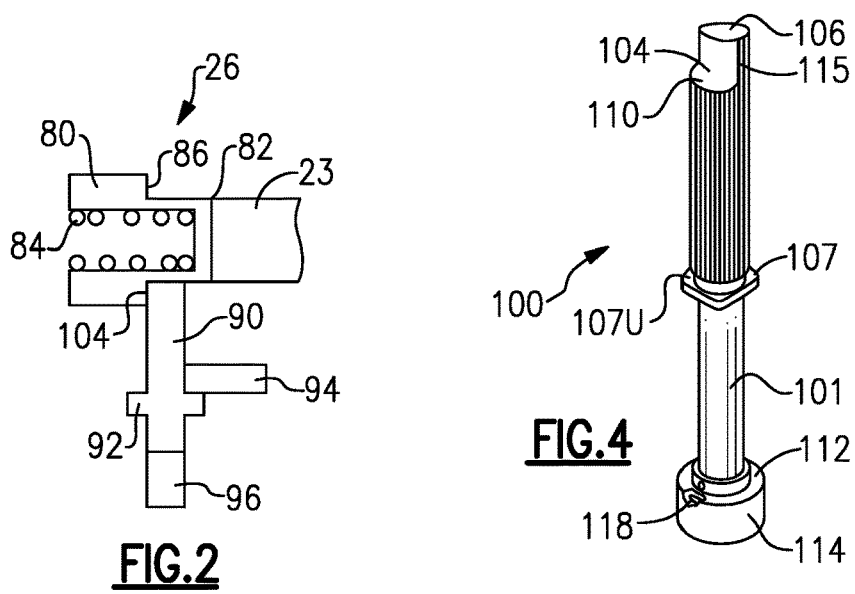
FIG.2
FIG.4

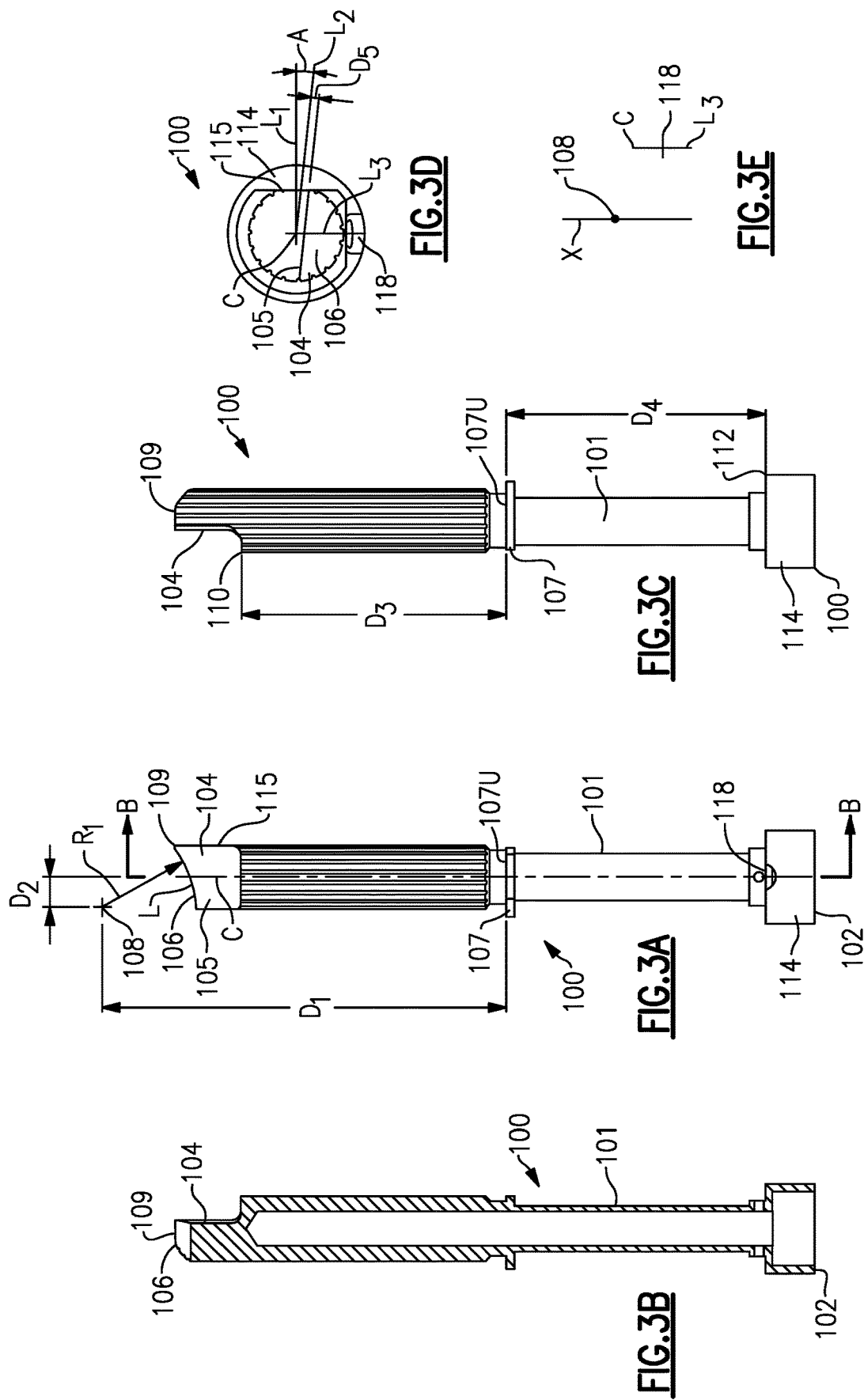

DISCONNECT PLUNGER FOR INTEGRATED DRIVE GENERATOR

BACKGROUND

This application relates to a disconnect plunger for a disconnect assembly in an integrated drive generator.

Integrated drive generators are known and often utilized in aircraft. As known, a gas turbine engine on the aircraft provides a drive input into a generator input shaft. The generator typically includes a disconnect shaft that can transmit the input into a gear differential. The gear differential selectively drives a main generator to provide electric power for various uses on the aircraft.

It is desirable that the generated power be of a desired constant frequency. However, the speed from the input shaft will vary during operation of the gas turbine engine. This would result in variable frequency.

Integrated drive generators are provided with speed trimming hydraulic units. Gears associated with the differential and, in particular, a ring gear portion, provide rotation from the differential back into the trimming unit. A carrier also rotates another portion of the trimming unit. The trimming unit is operable to result in the output speed of the differential being effectively constant, such that electric power of a desirable frequency is generated.

The generator is mounted between two housing portions and a seal plate is mounted between the two housing portions.

In addition, various accessory systems, such as various pumps, are driven by the carrier of the differential through an accessory drive gear.

A disconnect assembly disconnects the input shaft from transmitting rotation further into the generator under certain conditions. The disconnect assembly includes a disconnect plunger which selectively moves a disconnect shaft to stop rotation.

The disconnect plunger faces design challenges.

SUMMARY

A disconnect plunger for use in an integrated drive generator includes a plunger body extending between a first end and a second end. A cam surface is formed on the second end, and has a cylindrical cam portion extending across the second end. The cylindrical cam portion includes a location formed at a first radius about a point spaced beyond the second end relative to the first end. A first distance is defined from a second end facing surface of a cylindrical guide portion positioned intermediate the first and second end. A ratio of the first radius to the first distance is between 0.15 and 0.30. The point is spaced in a direction perpendicular to a center axis of the plunger body, and measured from the center axis by a second distance. A ratio of the second distance to the first radius is between 0.25 and 0.40. An integrated drive generator and a method of replacing a disconnect shaft are also disclosed.

These and other features may be best understood from the following drawings and specification.

BRIEF DESCRIPTION OF THE DRAWINGS

FIG. 1 schematically shows an integrated drive generator.
FIG. 2 schematically shows details of a disconnect assembly.
FIG. 3A is a first view of a disconnect plunger.

FIG. 3B is a cross-sectional view along line B-B of FIG. 3A.
FIG. 3C is a view similar to FIG. 3A, but not in cross-section.
FIG. 3D shows an end view of the disconnect plunger.
FIG. 3E shows a further detail.
FIG. 4 is an isometric view of a disconnect plunger.

DETAILED DESCRIPTION

FIG. 1 shows an integrated drive generator 20. As shown, housing portions 18 and 19 surround the integrated drive generator and a seal plate 17 sits between the housing portions 18 and 19.

A gas turbine engine 22 may drive an input shaft 23 which selectively drives a disconnect assembly 26. The disconnect assembly 26, in turn, drives a carrier shaft 28, which drives a carrier in a gear differential 30.

As the carrier shaft 28 rotates, planet gears 36 and 38 are caused to rotate. Gears 38 have a gear interface 42 with a first ring gear portion 40. Gears 36 have a gear interface 48 with a second ring gear portion 46.

Ring gear portion 40 has a gear interface 50 with a main generator drive gear 52. When drive gear 52 is driven to rotate, it rotates a rotor 56 associated with a stator 58 of the main generator as well as an exciter rotor 60. Electric power is generated for a use 62, as known.

It is desirable that the frequency of the generated electric power be at a desired frequency. This requires the input speed to gear 52 to be relatively constant and at the desired speed. As such, the speed of the input shaft 23 is added to the speed of the speed trimmer 66 to result in a constant input speed to gear 52.

A gear 15 that is part of the carrier has a gear interface 16 with a gear 13 driving a shaft 14 also within the speed trimmer.

As known, the speed trimmer 66 includes a variable unit 72 and a fixed unit 76. The units 72 and 76 may each be provided with a plurality of pistons and a swash plate arrangement. If the input speed of the gear 13 is too high, the speed of the gear 52 will also be too high, and hence, the speed trimmer 66 acts to lower the speed of the trim gear 46 which will drop the speed of gear 52. On the other hand, if the input speed is too low, the speed trimmer will increase the trim gear speed and the speed seen by gear 52 will increase.

In essence, the variable unit 72 receives an input through gear 13 that is proportional to the speed of the input shaft 23. The variable unit 72 also receives a control input from a control monitoring the speed of the generator rotor 56. The position of the swash plate in the variable unit 72 is changed to in turn change the speed and direction of the fixed unit 76. The fixed unit 76 can change the speed, and direction of rotation of the shaft 70, and this then provides control back through the trim ring gear 46 to change the speed reaching the generator. In this manner, the speed trimmer 66 results in the frequency generated by the generator being closer to constant, and at the desired frequency.

A permanent magnet generator 32 rotates with the ring gear 40.

An accessory drive shaft 29 rotates with the ring gear 40 and drives a plurality of accessory gears 31.

The operation of the integrated drive generator 20 is generally as known in the art. A worker of ordinary skill would recognize that the desired frequency and speed at use 62 would dictate a number of design functions.

FIG. 2 shows a disconnect assembly 26. As known, the input shaft 23 drives a disconnect shaft 80. A gear interface 82 between disconnect shaft 80 and input shaft 23 provides the rotation. A spring 84 biases the disconnect shaft 80 into the input shaft 23.

A shaft cam surface 86 on the disconnect shaft 80 mates with a plunger cam shaft 104 on a disconnect plunger 90. These cam surfaces are shown schematically in this view. A surface 92 on the disconnect plunger includes a notch to receive a plunger from solenoid 94. A spring 96 biases the disconnect plunger 90 toward the disconnect shaft 80. Should it be desired to stop rotational input, the solenoid 94 is actuated and the spring 96 biases the disconnect plunger to cause the disconnect shaft 80 to move against the force of spring 84 and to break contact at the gear interface 82.

FIG. 3A shows a disconnect plunger 100 defined by a body 101, which may be utilized in a disclosed embodiment. An enlarged end portion 114 defines one end 102 of the plunger 100. Plunger cam surface 104 mates with the disconnect shaft and has a cam surface that will cause the disconnect shaft to move towards and away the input shaft 23 as the disconnect plunger moves axially. Notch 118 receives the solenoid plunger.

A cylindrical cam portion 106 on the end of cam surface 104 has a location L formed at a radius $R_1$ away from a point 108, which is beyond a second end 109 of the disconnect plunger 100. A cylindrical guide portion 107 is formed intermediate ends 102 and 109. A second end facing surface 107U of the cylindrical guide portion 107 is spaced from point 108 by a first distance $D_1$. In one embodiment, $D_1$ was 3.79 inches (9.63 centimeters). In this embodiment, the radius $R_1$ is 0.880 inch (2.24 centimeters). For this and all dimensions in this application, it should be understood that a manufacturing tolerance of plus/minus 0.01 inch (0.025 centimeters) should be incorporated. In embodiments, a ratio of $R_1$ to $D_1$ was between 0.15 and 0.30.

In addition, point 108 is spaced in a direction perpendicular to a central axis C of the disconnect plunger 100 and from the center axis C by a second distance $D_2$. In one embodiment, $D_2$ was 0.280 inch (0.711 centimeters).

The point 108 forms a base for defining a circular portion at the location L, however, it also defines a basis for forming an axis X which defines points for measuring the same radius $R_1$ to define the remainder of the cylindrical cam portion 106. As shown in FIG. 3E, line $L_3$ is defined from the center axis C to bisect the notch 118. The axis X extends through point 108 and is parallel to line $L_3$. Thus, the cylindrical cam portion 106 can be defined utilizing the definition of the point 108 and the axis X.

Cam surface 104 is also shown to have a cam face 105 extending between cylindrical cam portion 106 and an opposed end 110 of cam surface 104.

In embodiments, a ratio of $D_2$ to $R_1$ is between 0.25 and 0.40.

FIG. 3B is a cross-section along line B-B of FIG. 3A and shows the complexity of the cam surface 104.

FIG. 3C is similar to the FIG. 3B view, however, it is not in section as is FIG. 3B. As shown, the second end facing surface 107U of the cylindrical guide portion 107 is spaced from end 110 marking the beginning point of the cam surface 104 by a distance $D_3$. The same surface 107U is spaced from an upper surface 112 of the enlarged third end portion 114 by a fourth distance $D_4$. In embodiments, $D_3$ was 2.45 inches (6.30 centimeters) and $D_4$ is 2.45 inches (6.00 centimeters).

In embodiments, a ratio of $D_3$ to $D_4$ was between 0.9 and 1.1.

FIG. 3D shows an end view of the disconnect plunger 100. As can be seen, cam face 105 extends at an angle across the disconnect plunger 100. The angle A can be defined between a line $L_1$ and a line $L_2$. Line $L_1$ extends from the center C of the disconnect plunger 100, and extending perpendicular to a flat surface 115 at the end of the cam surface 104. Line $L_1$ is also perpendicular to line $L_3$ which extends from center point C to bisect the notch 118. Line $L_2$ is parallel to the cam face 105, but spaced from the cam face 105 by a fifth distance $D_5$. In essence, the angle A defines a spacing between the notch 118 and the cam face 105. In an embodiment, angle A is 6.3 degrees. In embodiments, $D_5$ is 0.05 inches (0.13 centimeters). Angle A aligns parallel with the cam face 86 on the disconnect shaft 80. In embodiments, angle A is between 5.0 and 7.5 degrees. In further embodiments, a ratio of $R_1$ to $D_5$ is between 14 and 20.

FIG. 4 is an isometric view of a disconnect plunger and shows some of the surfaces that have been previously discussed.

A method of replacing a disconnect shaft in an integrated drive generator includes the steps of removing an existing disconnect plunger from an integrated drive generator. The integrated drive generator includes an input shaft having a gear interface with a disconnect shaft. The disconnect shaft is for driving gears to rotate a generator. The disconnect shaft includes a shaft cam surface, and has a spring biasing it to be in contact with the input shaft. The existing disconnect plunger has a plunger cam surface for mating with the shaft cam surface on the disconnect shaft, and for causing the disconnect shaft to be selectively moved against the spring force, and away from the input shaft. The method also includes the step of replacing the existing disconnect plunger. The replacement disconnect plunger includes a plunger body extending between a first end and a second end. A replacement cam surface is formed on the second end, and has a cylindrical cam portion extending across the second end. The cylindrical cam portion includes at least a location formed at a first radius about a point spaced beyond the second end relative to the first end. A first distance is defined from a second end facing surface of a cylindrical guide portion positioned intermediate the first and second end. A ratio of the first radius to the first distance is between 0.15 and 0.30. The point is spaced in a direction perpendicular to a center axis of the plunger body, and measured from the center axis by a second distance. A ratio of the second distance to the first radius is between 0.25 and 0.40.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A disconnect plunger for use in an integrated drive generator comprising:

a plunger body extending between a first end and a second end, there being a cam surface formed on said second end, said cam surface having a cylindrical cam portion extending across said second end, and said cylindrical cam portion includes at least a location formed at a first radius about a point spaced beyond said second end relative to said first end, and a first distance being defined from a second end facing surface of a cylindrical guide portion positioned intermediate the first and second end, and a ratio of said first radius to said first distance being between 0.15 and 0.30;

said point being spaced in a direction perpendicular to a center axis of said plunger body, and measured from said center axis by a second distance, and a ratio of said second distance to said first radius being between 0.25 and 0.40;

wherein a third distance is defined to an end of said cam surface spaced closest to said first end, and from said second end facing surface of said cylindrical guide portion, and a fourth distance is defined from said second end facing surface of said cylindrical guide portion to an enlarged portion surface of an enlarged portion extending to said first end, said enlarged portion surface spaced toward said second end from said first end, and a ratio of said third distance to said fourth distance being between 0.9 and 1.1;

wherein said enlarged portion including a notch for receiving a solenoid plunger;

wherein an angle is defined by a first line and a second line, said second line formed parallel to a cam face on said cam surface that extends to said cylindrical cam portion, said first line being defined from a center axis of said plunger body perpendicular to a third line which extends from said center axis and bisects said notch, and said angle is between 5.0 and 7.5 degrees; and wherein a fifth distance is defined as a distance that said second line is spaced from said cam face, and a ratio of said first radius to said fifth distance is between 14 and 20.

2. An integrated drive generator comprising:

an input shaft;

a disconnect shaft having a gear interface with said input shaft, said disconnect shaft including a shaft cam surface, the disconnect shaft being biased toward contact with said input shaft;

a disconnect plunger having a plunger cam surface for mating with said shaft cam surface on said disconnect shaft, and for causing said disconnect shaft to be selectively moved against said bias, and away from said input shaft, said disconnect shaft having a plunger body extending between a first end and a second end, said plunger cam surface formed on said second end, said plunger cam surface having a cylindrical cam portion extending across said second end, and said cylindrical cam portion including a location formed at a first radius about a point spaced beyond said second end relative to said first end, and a first distance being defined from a second end facing surface of a cylindrical guide portion positioned intermediate the first and second end, and a ratio of said first radius to said first distance being between 0.15 and 0.30;

said point being spaced in a direction perpendicular to a center axis of said plunger body, and measured from said center axis by a second distance, and a ratio of said second distance to said first radius being between 0.25 and 0.40;

wherein a third distance is defined to an end of said plunger cam surface spaced closest to said first end, and from said second end facing surface of said cylindrical guide portion, and a fourth distance is defined from said second end facing surface of said cylindrical guide portion to an enlarged portion surface of an enlarged portion extending to said first end, said enlarged portion surface spaced toward said second end from said first end, and a ratio of said third distance to said fourth distance being between 0.9 and 1.1;

wherein said enlarged portion including a notch receiving a solenoid plunger;

wherein an angle is defined by a first line and a second line, said second line formed parallel to a cam face on said plunger cam surface that extends to said cylindrical cam portion, said first line being defined from a center axis of said plunger body and perpendicular to a third line which extends from said center axis and bisects said notch, and said angle is between 5.0 and 7.5 degrees; and wherein a fifth distance is defined as a distance that said second line radius is spaced from said cam face, and a ratio of said first radius to said fifth distance is between 14 and 20.

3. A method of replacing a disconnect shaft in an integrated drive generator comprising the steps of:

removing an existing disconnect plunger from an integrated drive generator, the integrated drive generator including an input shaft having a gear interface with a disconnect shaft, said disconnect shaft for driving gears to rotate a generator, said disconnect shaft including a shaft cam surface, the disconnect shaft having a spring biasing said disconnect shaft to be in contact with said input shaft, and said existing disconnect plunger having a plunger cam surface for mating with said shaft cam surface on said disconnect shaft, and for causing said disconnect shaft to be selectively moved against said spring force, and away from said input shaft;

replacing said existing disconnect plunger with a replacement disconnect plunger, said replacement disconnect plunger includes a plunger body extending between a first end and a second end, there being a replacement plunger cam surface formed on said second end, said replacement plunger cam surface having a cylindrical cam portion extending across said second end, and said cylindrical cam portion including a location formed at a first radius about a point spaced beyond said second end relative to said first end, and a first distance being defined from a second end facing surface of a cylindrical guide portion positioned intermediate the first and second end, and a ratio of said first radius to said first distance being between 0.15 and 0.30;

said point being spaced in a direction perpendicular to a center axis of said plunger body, and measured from said center axis by a second distance, and a ratio of said second distance to said first radius being between 0.25 and 0.40;

wherein a third distance is defined to an end of said replacement plunger cam surface spaced closest to said first end, and from said second end facing surface of said cylindrical guide portion, and a fourth distance is defined from said second end facing surface of said cylindrical guide portion to an enlarged portion surface of an enlarged portion extending to said first end, said enlarged portion surface spaced toward said second end from said first end, and a ratio of said third distance to said fourth distance being between 0.9 and 1.1;

wherein said enlarged portion including a notch to receive a solenoid plunger;

wherein an angle is defined by a first line and a second line, said second line formed parallel to a cam face on said replacement plunger cam surface that extends to said cylindrical cam portion, said first line being defined from a center axis of said plunger body and perpendicular to a third line which extends from said center axis and bisects said notch, and said angle is between 5.0 and 7.5 degrees; and wherein a fifth distance is defined as a distance that said second line is spaced from said cam face, and a ratio of said first radius to said fifth distance is between 14 and 20.

\* \* \* \* \*